US009173233B2

(12) United States Patent
Almeida et al.

(10) Patent No.: US 9,173,233 B2
(45) Date of Patent: Oct. 27, 2015

(54) COMMUNICATION EFFICIENCY

(71) Applicant: Nokia Corporation, Espoo (FI)

(72) Inventors: Erika Portela Lopes De Almeida, Manaus (BR); Andre Mendes Cavalcante, Manaus (BR); Fuad Mousse Abinader, Jr., Manaus (BR); Sayantan Choudhury, Berkeley, CA (US); Fabiano Chaves, Manaus (BR); Klaus Franz Doppler, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 131 days.

(21) Appl. No.: 14/064,628

(22) Filed: Oct. 28, 2013

(65) Prior Publication Data
US 2015/0117418 A1   Apr. 30, 2015

(51) Int. Cl.
H04Q 7/24 (2006.01)
H04W 74/02 (2009.01)

(52) U.S. Cl.
CPC .................... *H04W 74/02* (2013.01)

(58) Field of Classification Search
USPC .......................................... 370/252, 338, 328
See application file for complete search history.

(56) References Cited

U.S. PATENT DOCUMENTS

| 2003/0174664 | A1  | 9/2003 | Benveniste |
| 2007/0025384 | A1* | 2/2007 | Ayyagari et al. ............... 370/445 |
| 2009/0147768 | A1  | 6/2009 | Ji et al. |
| 2015/0023274 | A1* | 1/2015 | Morita ........................... 370/329 |

FOREIGN PATENT DOCUMENTS

| WO | 03/039054 A2 | 5/2003 |
| WO | 2008/084186 A1 | 7/2008 |

OTHER PUBLICATIONS

"IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications", IEEE Std 802.11, Mar. 29, 2012, 2793 pages.

International Search Report and Written Opinion received for corresponding Patent Cooperation Treaty Application No. PCT/FI2014/050735, dated Nov. 4, 2014, 16 pages.

* cited by examiner

*Primary Examiner* — Duc C Ho
(74) *Attorney, Agent, or Firm* — Nokia Technologies Oy

(57) ABSTRACT

There is provided a method, comprising: detecting, by a node of a first wireless network, that at least one overlapping second wireless network is configured to apply contention periods and contention-free periods for communicating with different subsets of devices; detecting that a contention period timing applied by the at least one overlapping second wireless network is not aligned with a contention period timing applied by the node of the first wireless network; and causing a modification of the contention period timing in at least one of the wireless networks in order to have the contention periods to take place at least partly at the same time in each overlapping wireless network.

20 Claims, 4 Drawing Sheets

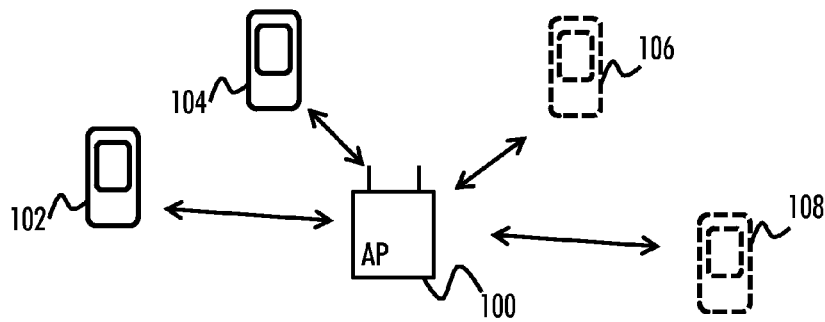

FIG. 1

200 DETECTING THAT AT LEAST ONE OVERLAPPING SECOND WIRELESS NETWORK IS CONFIGURED TO APPLY CONTENTION PERIODS AND CONTENTION-FREE PERIODS FOR COMMUNICATING WITH DIFFERENT SUBSETS OF DEVICES

↓

202 DETECTING THAT A CONTENTION PERIOD TIMING APPLIED BY THE AT LEAST ONE OVERLAPPING SECOND WIRELESS NETWORK IS NOT ALIGNED WITH A CONTENTION PERIOD TIMING APPLIED BY THE NODE OF THE FIRST WIRELESS NETWORK

↓

204 CAUSING A MODIFICATION OF THE CONTENTION PERIOD TIMING IN AT LEAST ONE OF THE WIRELESS NETWORKS IN ORDER TO HAVE THE CONTENTION PERIODS TO TAKE PLACE AT LEAST PARTLY AT THE SAME TIME IN EACH OVERLAPPING WIRELESS NETWORK

FIG. 2

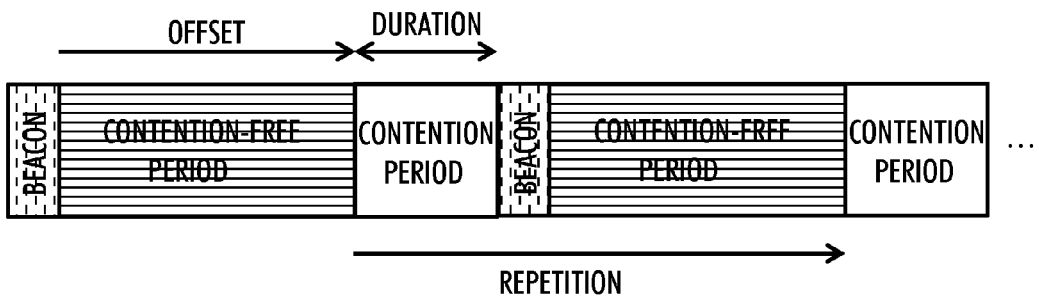

FIG. 3

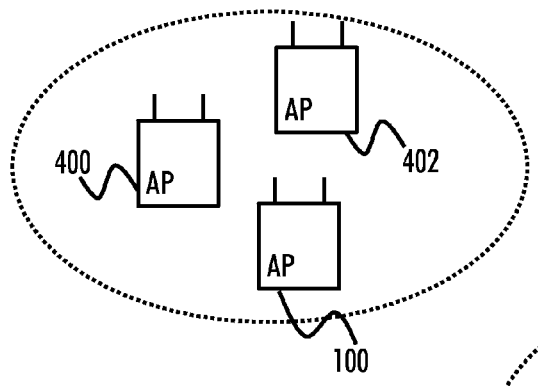
FIG. 4A
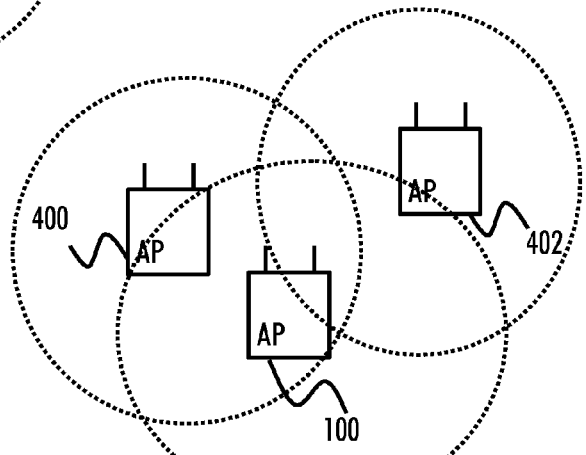
FIG. 4B
| ID | LENGTH | LP OPTIONS | LP OFFSET | LP DUR. | LP REP. | # OF BSSIDs | LIST OF BSSIDs |
502 CONFLICT INDICATOR
500 CP TIMING-RELATED INFORMATION ELEMENT
FIG. 5A
| ID | LENGTH | LP OPTIONS | LP OFFSET | LP DUR. | LP REP. | # OF BSSIDs | LIST OF BSSIDs | TSF TIMESTAMP |
502 CONFLICT INDICATOR
504 PROPOSAL MESSAGE
FIG. 5B

COMMUNICATION EFFICIENCY

FIELD

The invention relates generally to wireless access networks.

BACKGROUND

There may be scenarios in which several wireless networks are overlapped with each other. This may happen, for example, in dense deployments of wireless network. Further, there may be cases where high efficiency up-to-date devices share the available spectrum with legacy devices.

BRIEF DESCRIPTION OF THE INVENTION

According to an aspect of the invention, there is provided a method as specified in claim 1.

According to an aspect of the invention, there are provided apparatuses as specified in claim 10.

According to an aspect of the invention, there is provided a computer program product as specified in claim 20.

According to an aspect of the invention, there is provided a computer-readable distribution medium carrying the above-mentioned computer program product.

According to an aspect of the invention, there is provided an apparatus comprising means for performing any of the embodiments as described in the appended claims.

Embodiments of the invention are defined in the dependent claims

LIST OF THE DRAWINGS

In the following, the invention will be described in greater detail with reference to the embodiments and the accompanying drawings, in which FIG. 1 presents a network according to an embodiment;

FIG. 2 shows a method according to an embodiment;

FIG. 3 shows that contention-free periods and contention periods may be used to offer communication capabilities to users, according to an embodiment;

FIGS. 4A and 4B illustrate some overlapping scenarios according to some embodiments FIG. 5A depicts an information element according to an embodiment;

FIG. 5B depicts a proposal message according to an embodiment;

DESCRIPTION OF EMBODIMENTS

Figure 6:
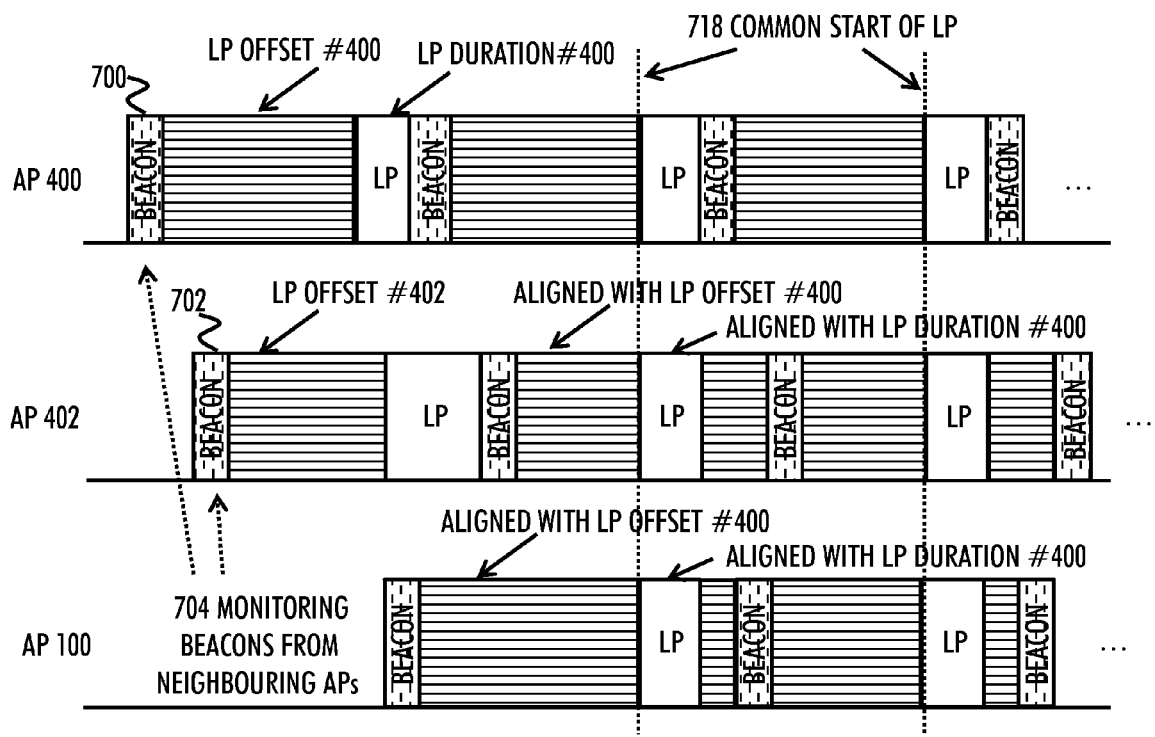
FIGS. 6 and 7 illustrate a scenario where contention period timings of different wireless networks are not aligned, according to an embodiment.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The number of IEEE 802.11-enabled mobile devices is increasing. The IEEE 802.11 is a set of standards for implementing wireless local area network (WLAN), also known as the Wi-Fi. Such an IEEE 802.11-enabled station (STA), such as user terminals/equipment 102-108 in FIG. 1, may associate and communicate with an access node/point (AP) 100. The STA 102-108 may comprise a mobile phone, a palm computer, a wrist computer, a laptop, a personal computer, or any device capable to access the wireless radio access network, such as the WLAN. The access node 100 may be a WLAN (IEEE 802.11) access point (e.g. Wi-Fi base stations), for example.

As the use of WLAN is becoming more common, it may be important to provide high communication efficiency also in dense operating environments. As one option, a study group for a High Efficiency WLAN (HEW) has been set up. The HEW focus on improving the spectral efficiency to enhance the system throughput. Further, so called contention-free operation may be used to avoid channel access time waste due to back-off duration. As a result, contention-free devices 102-104 marked with solid lines may advantageously benefit from applying the contention-free techniques. However, full contention-free operation mode may not provide a solution for the coexistence of legacy devices 106-108 marked with dashed lines, even though the support to legacy devices 106-108 is one of the key points for the implementation of a contention-free Wi-Fi operation.

In general, contention-based techniques may be inefficient in terms of resource management because they waste channel access time during back-off periods and during the contention. For example, even with some of the up-to-date channel access techniques, such as the distributed coordination function (DCF), the point coordination function (PCF), the Hybrid Controlled Channel Access (HCCA), and the power-save multi-poll (PSMP), a fair amount of time is wasted in contention between overlapped basic service sets (OBSSs), especially with dense Wi-Fi deployments. According to the contention-free mechanisms, efficient communication takes place during the contention-free periods, during which the channel access may be determined by the APs 100. However, even if the contention-free techniques are able to enhance the overall network throughput, one challenge in their use for Wi-Fi deployments may be to provide support for legacy devices 106-108, which may not be able to operate in such contention-free networks. In other words, the legacy STAs 106-108, which operate according to a contention protocol, may need to be supported as well.

Accordingly, there is provided a solution for supporting legacy devices 106-108 operation among overlapping contention-free mode APs. This may be achieved by synchronizing the APs of overlapping BSSs operating in the contention-free mode, so that a common time window (known as a contention period) is created to support legacy stations 106-108 in the overlapped wireless network. The created common time window may be separated from the contention-free periods in the overlapped network. Moreover, owing to such synchronization, the legacy STAs 106-108 need not interfere with the "high efficiency non-legacy STAs" (i.e. the contention-free capable, up-to-date devices 102-104) that operate during the contention-free periods.

The AP 100 of the first wireless network may, in step 200, detect that at least one overlapping second wireless network is configured to apply contention periods (CPs, also known as legacy periods (LPs)) and contention-free periods (CFPs) for communicating with different subsets of users/devices. The wireless networks may be distinguished by detecting the basic service set identifier (BSSID) broadcasted by a network node, such as the AP 100, of the corresponding network. As the AP 100 of the first wireless network is able to detect the BSSID of the second wireless network, broadcasted by an AP of the second wireless network, the AP 100 may detect the second wireless networks that are at least partially overlapping with the first wireless network. In an embodiment, the wireless networks are wireless local area networks (WLANs).

In an embodiment, the overlap situation is as depicted in FIG. 4A. Let us assume that each network node 100, 400, 402 provides a unique BSSID and consequently provides a unique wireless network. In FIG. 4A, each network node, such as an access node/point, 100, 400, 402 may be within the coverage area of each other wireless network. In this case, each AP 100, 400, 402 may be able to detect beacon transmissions of each other AP 100, 400, 402.

However, in another embodiment, the overlapping scenario is as depicted in FIG. 4B in which the overlap of networks is different. In FIG. 4B, the nodes 400, 402 may not know that their coverage areas overlap partially. However, the AP 100 may be located in the middle, detect the beacon transmissions from both of the APs 400, 402, and may thus be able to detect the overlap.

Let us further denote the network provided by the AP 100 as the first wireless network and the networks provided by the APs 400, 402 as the at least one second wireless network.

FIG. 3 depicts how the configuration of the CPs and CFPs may be organized in a wireless network. As shown, a network node may periodically transmit, e.g., beacons or other advertisement message to indicate its presence and availability to the STAs in the coverage area. Data communication may comprise the CFP for contention-free communication with contention-free capable devices 102-104 and the CP for communication with contention based legacy devices 106-108. These CFPs and CPs may be periodical, as shown in FIG. 3.

Likewise, the AP 100 may be configured to apply contention-free periods and contention periods for communicating with different subsets of users. In such situation, if each of the wireless networks were to decide the timings of the CFPs and the CPs itself without consideration of the other overlapping network(s), then there might not be any common legacy period. As the contention/legacy periods in the wireless networks may be for supporting legacy stations 106-108 in the wireless networks, the lack of a common LP may cause a problem for the communication efficiency in the overlapping scenario.

Accordingly, in step 202, the AP 100 may detect that a contention period timing applied by the at least one overlapping second wireless network is not aligned with a contention period timing applied by the AP 100. In an embodiment, the contention period timing is defined at least partly by a start time (e.g. offset from the beacon), duration and a repetition rate of the contention period, as shown in FIG. 3. The detection may be acquired by monitoring advertisement transmissions from the corresponding node 400, 402 of the overlapping second wireless network, or by explicitly requesting the information from the corresponding node 400, 402, for example.

In step 204, the AP 100 may cause a modification of the contention period timing in at least one of the wireless networks in order to have the CPs to take place at least partly at the same time in each overlapping wireless network. The AP 100 may thus adjust its own CP timing and/or propose an adjustment in at least one second wireless network, as will be described later. The contention periods may overlap fully or only partly. E.g. a contention period of the AP 100 may be longer than the contention period provided by another AP, such as the AP 400, 402. In such case, it may be enough if the shorter contention period is within the longer contention period or if the contention periods overlap partly. Partial alignment may be easier to establish whereas full alignment (overlap) may be more efficient in improving the overall throughput of the networks.

By achieving such alignment in CP timings, a common "silent" window (i.e. the legacy period) for contention-based operation may be generated in the overlapping network scenario. Other non-legacy APs entering the existing network may then synchronize their legacy periods according to this common legacy period. This may increase the overall communication efficiency in the overlapping wireless network. Further, owing to the common LP, the contention-free approaches may be implemented in WiFi networks such that compatibility of the legacy devices 106-108 is maintained.

Let us now look at more closely how the AP 100 may detect the misalignment of the CP timings and how the AP 100 may react on such detection. In an embodiment, the AP 100 may receive a timing-related information element (IE) 500 from at least one overlapping second wireless network, wherein the IE 500 indicates the contention period timing in the corresponding overlapping second wireless network. In an embodiment, this IE 500 may be comprised in an advertisement message, e.g. a beacon or in a probe response message from the node 400, 402. The corresponding node 400, 402 may in this way advertise the legacy period timing adopted in that BSS, so that the neighbouring APs (including the AP 1020) are able to adopt the same timing of the CP.

An example of the information element 500 is shown in FIG. 5A. This IE 500 may inform that the AP (e.g. the AP 400, 402), which transmitted the IE 500, is capable of synchronizing with other APs that have the same capability. In other words, that this AP supports the proposed mechanism to obtain a common legacy period. Simultaneously, the IE 500 may advertise CP-related time domain (timing) parameters to the other APs. As shown in FIG. 5A, the IE 500 may comprise several fields indicating possibly but not necessarily, e.g., an element identifier (ID), a length of the IE 500, number of neighbouring BSSIDs detected (identified), and a list of the detected neighbour BSSIDs.

Further, the IE 500 may comprise fields indicating the timing parameters of the CP. In an embodiment, these may comprise a legacy period (LP) offset—field indicating time units between the current time stamp (e.g. the one contained in the beacon) and the beginning of the CP, a LP duration—field indicating the time units between the beginning of the CP and the end of the CP, and a LP repetition—field indicating the time units between the immediate next and the second next CP. The exact values for these CP timing parameters may be based on empirical derivation or mathematical modelling, for example.

In an embodiment, time between any two consecutive CPs is the same. However, in an embodiment, the time between two consecutive CPs varies. This may be needed when traffic load in the corresponding wireless network changes, or when the ratio between the legacy 106-108 and the contention-free capable devices 102-104 change, for example. In this way it may be beneficial to give the periodicity information separately in each beacon, or at least each time the periodicity changes.

Further, the IE 500 may comprise LP options—field carrying, e.g. a conflict indicator 502 for indicating if there is a conflict with the CP window proposed by at least one neighbouring wireless network. In an embodiment, the conflict indicator 502 may be the most significant bit (0 or 1) in this field of the IE 500. This LP options—field may further indicate the time granularity used in the CP timing parameters (e.g. the fields marked as LP offset, LP duration and LP repetition). This information about the TG may occupy, e.g., four bits in the field. The LP options—field may further indicate if this field is repeated in the future beacons, for example.

As the AP 100 in this manner acquires information about the CP timing applied in the neighbouring BSSs, the AP 100 may determine if this CP timing configuration is acceptable for the AP 100. In determining this, the AP 100 may consider the traffic load of the AP 100 and/or ratio between the legacy devices 106-108 and the contention-free capable devices 102-104. In case, the indicated CP timing is acceptable (e.g. in case the informed legacy period/window is enough for the operation of the legacy devices 106-108 associated with the AP 100), the AP 100 may decide to modify its CP timing according to the indicated CP timing (e.g. synchronize with the indicated CP timing).

Further, in an embodiment, the AP 100 may include an indication of the changed CP timing in a next advertisement message, such as in the next beacon. In other words, the AP 100 may include the IE 500 of FIG. 5A in the next advertisement message so that other APs 400, 402 and legacy devices 106-108 become aware of the changed timing parameters. The conflict indicator 502 of the transmitted IE 500 may indicate that there is no conflict (such as "0"), as there may not be any conflicts in the CP timings of different overlapping networks.

In an embodiment, upon deciding to change the CP timing of the network, the AP 100 may cause a transmission of a proposal message 504 to the at least one second wireless network 400, 402. An example of the proposal message 504 is given in FIG. 5B. In an embodiment, the fields of the proposal message 504 comprise the same fields as in the IE 500. In addition, the proposal message 504 may include a timestamp—field, that may represent the value of the timing synchronization function (TSF). The TSF may be used to keep the timers for all neighbouring APs 100, 400, 402 in the overlapped network synchronized, as explained later. It may be noted that such TSF information may also be contained in the advertisement message, such as in the beacon. Table 1 gives an example length for the fields of the IE 500 and of the proposal message 504 in octets.

TABLE 1

Length of information fields in octets

| | ID | Length | Options | Offset | Dur. | Rep. rate | # of BSSIDs | List of BSSIDs | Timestamp |
|---|---|---|---|---|---|---|---|---|---|
| Length | 1 | 1 | 2 | 2 | 2 | 2 | 1 | variable, 5 per BSSID | 8 |

As such the proposal message 504 sent by the AP 100 may include at least a proposal of the new (changed) CP timing. Further, the proposal message may additionally comprise an indication that the new CP timing conflicts with the current CP timing. That is, the conflict indicator 502 of the proposal message 504 may be set to "1" in this case. In case the neighbouring APs 400, 402 do not have conflicts with other APs, and agree to the new CP proposed, the suggestion from the AP 100 may be adopted, and all APs 400, 402 adjust their CP timers and indicate the adjustment in the next advertisement message (e.g. in the next beacon) from these APs 400, 402.

The use of the proposal message 504 may be used to "speed up" the synchronization between APs 100, 400, 402. For example, without applying the proposal message 504, the AP 100 may need to wait for the next beacon time (TBTT) before the AP is able to notify and allow the other APs 400, 402 to synchronize with the proposed time window. The TBTT may be, e.g. 100 ms. Thus, the use of the proposal message may expedite the inter-AP communication. Furthermore, due to possible interference, the APs 100, 400, 402 may not be able to decode beacons from neighbouring APs. In this case the legacy period—related information may be lost. Thus, the proposal message 504 may provide another attempt to reach neighbouring APs.

In an embodiment, there are many second wireless networks overlapping. In an embodiment, the AP 100 may determine whether or not the CP timings in each of the second wireless networks are aligned with each other. Let us assume that the CP timings are aligned. This may be the case when the AP 100 enters to an overlapped network provided by already synchronized APs 400, 402 (such as depicted in FIG. 4A). As the CP timings of other networks are aligned, the AP 100 may decide to modify the CP timing of its own network on the basis of the CP timing in the other wireless networks established by the APs 400, 402. A further requirement for agreeing with the advertised CP timing parameters may be that the AP 100 itself does not have any problem with the proposed CP timing. Such synchronization may occur by the AP 100 reading the CP parameters of the IE 500 from each neighbour AP 400, 402 and adjusting its own CP timers according to the indicated CP timing parameters (e.g. offset, duration, repetition). Then the AP 100 may inform the legacy STAs and other APs of the changed CP timing values by broadcasting a beacon with a corresponding IE 500.

However, in an embodiment, the AP 100 does not agree with the CP timing information indicated. For example, in an embodiment, the AP 100 itself may not be able to serve its associated legacy STAs 106-108 with the proposed CP timing. In such case, the AP 100 may decide to propose its own CP timing to the neighbouring overlapping networks. If accepted by them, then the proposed CP timing is applied in the overlapping network.

In an embodiment, the AP 100 may determine that the CP timing in at least one of the overlapping wireless networks (provided by APs 400, 402) is not aligned with the CP timing(s) in the rest of the overlapping wireless networks. This may happen due to the APs 400, 402 being distant from each other so that they are not able to detect each other's transmissions, as depicted in FIG. 4B.

Figure 7:
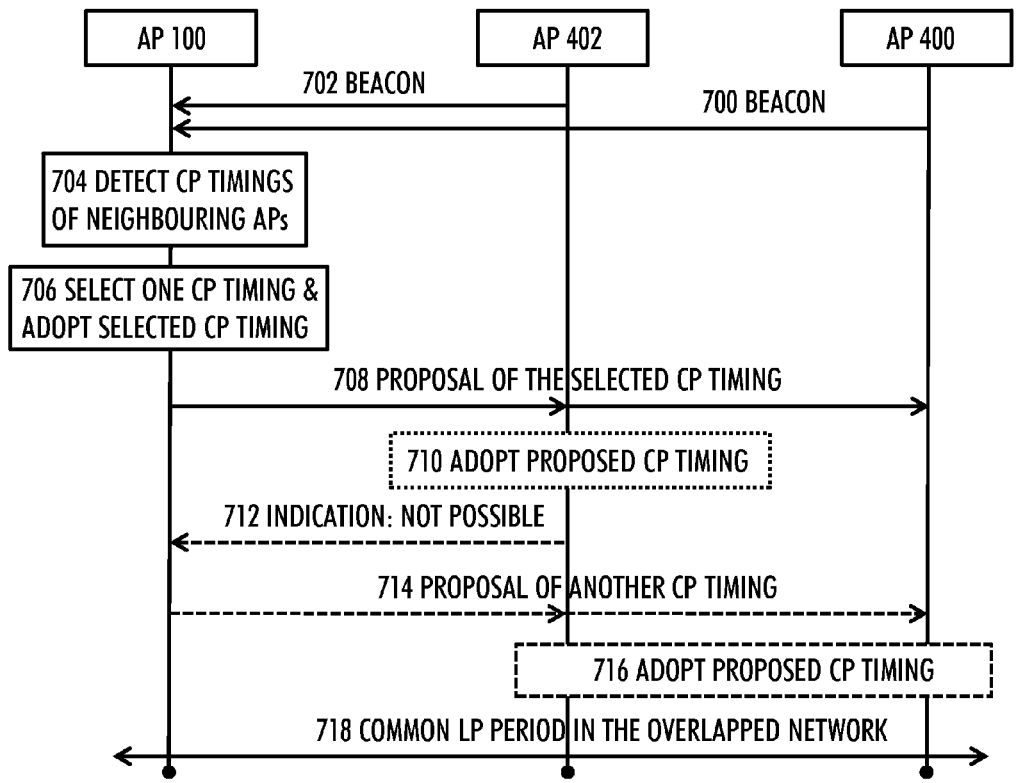

Accordingly, the AP 100 may monitor the spectrum in order to decode the beacons 700, 702 from neighbouring APs, as shown in FIGS. 4B, 6 and 7. The AP 100 may, in step 704, recognize two neighbouring APs 400, 402 on the basis of the beacons. However, the beacons (or other messages comprising the IE 500) from the APs 400, 402 may comprise distinct values for the CP timing parameters (e.g. different LP offsets and/or LP durations). As shown in FIG. 6, the AP 400 may initially apply LP offset #400 and the AP 402 may initially apply the LP offset #402. The AP 100 acquires knowledge of this by decoding the respective IEs 500 comprised in the beacons, for example.

Thereafter, the AP 100 may, in step 706, select one of the detected CP timings. Let us now assume that the AP 100 selects the CP timing of AP 400. The AP 100 may also synchronize its own CP timing according to the selected CP timing of the AP 400. However, the AP 402 may not be aware that it should change its CP timing. Therefore, the AP 100 may, in step 708, transmit the proposal message 504 to the plurality of second wireless network provided by APs 400, 402. The proposal message 504 may, as earlier explained, include the proposal of the selected CP timing (i.e. the one from AP 400). As shown, at the first time the AP 100 accesses the channel and sends a beacon, the AP 100 may already be configured to operate according to the CP timing of the AP 400. Further, the proposal message 504 may comprise an indication that the selected CP timing is proposed in order to solve a CP timing conflict among the plurality of second wireless networks. That is, the conflict indicator 502 may be set to "1", for example, so that the neighbouring APs 400, 402 become aware that the proposed CP timing is trying to solve a conflict.

As the AP 400 receives and decodes the information in the beacon from the AP 100, the AP 400 need not do any changes because the proposed CP timing is the one the AP 400 is already using. Also, as the AP 400 detects the conflict indicator, the AP 100 becomes aware that the proposal is trying to solve a conflict in the CP timings in the overlapped networks. However, as the AP 402 receives and decodes the information in the beacon from the AP 100, the AP 402 may detect that the proposed CP timing differs from its own CP timing. Further, the AP 402 detects that this proposal is trying to solve the conflict. As a consequence, the AP 402 may, in step 710, synchronize with the proposed CP timing. The AP 402 may first check does the proposed LP window have any conflicts with other LP windows among the neighbours of the AP 402 (including the AP 100 and possibly some other APs not shown in FIG. 4B). In case no further conflicts exist, the AP 402 may change the CP timing (e.g. LP offset and LP duration) according to the proposal in step 710. In this case, in the next beacon from the AP 402, the AP 402 may advertise the changed LP window parameters (e.g. LP offset and LP duration). As a result, all the APs 100, 400, 402 may provide the LP window simultaneously from point 718 onwards. Although shown in FIG. 6 that the LP duration is also aligned, in an embodiment, the LP duration is not aligned and, e.g. the AP 402 keeps the longer contention period.

In an embodiment, although not depicted in FIGS. 6 and 7, the AP 402 detects that the originally used contention period timing already overlaps partially with the proposed CP timing of the AP 400. In such case, the AP 402 may inform, with the proposal message 504, its CP timing parameters, so that the AP 400 may detect that the CP timing of AP 402 overlaps partially with the CP timing of AP 400. Thereafter, this overlapping CP part may be used for communication with the legacy devices 106-108. However, it may be that aligning the CP timings fully (as depicted in FIG. 6) may be more efficient in improving the overall throughput of the networks.

However, in case the AP 402 is, e.g. already synchronized with some other APs (not shown in FIG. 4B), and is consequently not able to synchronize with the proposed CP timing, the step 710 may not take place. Instead, the AP 402 may decide to keep its own CP timing. Further, the AP 402 may then set the conflict indicator as "1" in its own proposal message 504 or in its own information element 500 sent to the neighbouring APs 100 in step 712. This may be beneficial so that the receivers know that the AP 402 was not able to synchronize with the proposed CP timing and that the AP 402 is proposing a new CP timing which likewise tries to solve a conflict. In such case, the AP 100 may select another CP timing (such as the one recently proposed by the AP 402) and propose this CP timing to the AP 400 in step 714. As a result, the AP 400 may adopt the newly proposed CP timing in step 716. In case, the proposed CP timing is not the one used by the AP 402, the AP 402 may also adopt these CP timing values. As a result, the overlapped BSSs may, from point 718 onwards, share a common LP for supporting the operation of the legacy devices.

In case, the conflict cannot be solved even with the second (or third, fourth, etc. in cases of many networks overlapping) message, the AP 100 may choose one of its neighbours to be synchronized with. The selected CP timing may be the CP timing which is most commonly used among the overlapped networks. In such case, there may not be one common period for the LP window among all the networks, but there may be one LP window which at least many of the overlapping networks are applying.

In an embodiment, the AP 100 may transmit the proposal message 504 during a contention period of that wireless network (provided by AP 402) whose CP timing is to be changed. This is shown in FIG. 6, wherein the beacon from the AP 100 is transmitted at the LP period of the AP 402. As understood, the AP 100 becomes aware of this LP period by receiving the beacon 702 from that AP 402. This may be advantageous so that the AP 402 is more likely able to receive the beacon correctly. For example, let us assume that the first transmission of the proposal message 504 is performed at an arbitrary selected time point (i.e. not necessarily during the LP period of AP 402). Let us further assume that the first transmission of the proposal message 504 does not cause the desired effect in the overlapped network and none of the APs 400, 402 is replying the reason for the unsuccessfulness. Consequently, the AP 100 may, on the second time, transmit the proposal message 504 during the LP period of the AP 402.

In one embodiment only the AP 100 is supporting the mechanism to derive a common LP. In this case, there may not be any need to synchronize the CP timings with other APs. The AP 100 may still inform the legacy devices 106-108 about the LP used by this AP 100 in order to permit the legacy devices 106-108 to access the channel during this LP. Thus, the AP 100 may send, e.g., a beacon with the IE 500 having the CP timing parameters currently in use by the AP 100.

In an embodiment, in case there are no or little legacy devices in the overlapping wireless network, the CP timing applied in the network may set the LP duration to a minimum permitted value. Such minimum permitted value may be predefined.

In an embodiment, the AP 100 may keep track of the clock drifts in the APs 400, 402 by receiving information of the neighbouring APs' 400, 402 timing synchronization function (TSF) timers. This information may be indicated in the advertisement message, such as in the beacon, from the corresponding AP 400, 402. Thereafter, the AP 100 may calculate the offset and time drift of its own TSF timer in relation to the neighbouring APs' 400, 402 TSF timers. By calculating these drifts, the AP 100 may make any needed adjustments in order to keep the legacy periods and their repetitions synchronized to the neighbouring BSSs. In case there are many neighbours with different clock drifts, the AP 100 may apply the most delayed clock drift when adjusting its own clock. In this way the TSF may be used to keep the timers for all APs 100, 400, 402 in the overlapped network synchronized. The APs 100, 400, 402 may periodically adjust the TSFs in order to remain synchronized with the neighbouring APs.

Further, as the proposal message 504 may carry information of the timestamp of the TSF, the AP that receives the timestamp is able to synchronize with the sender, even in cases where the receiving AP had previously missed the beacon.

Figure 8:
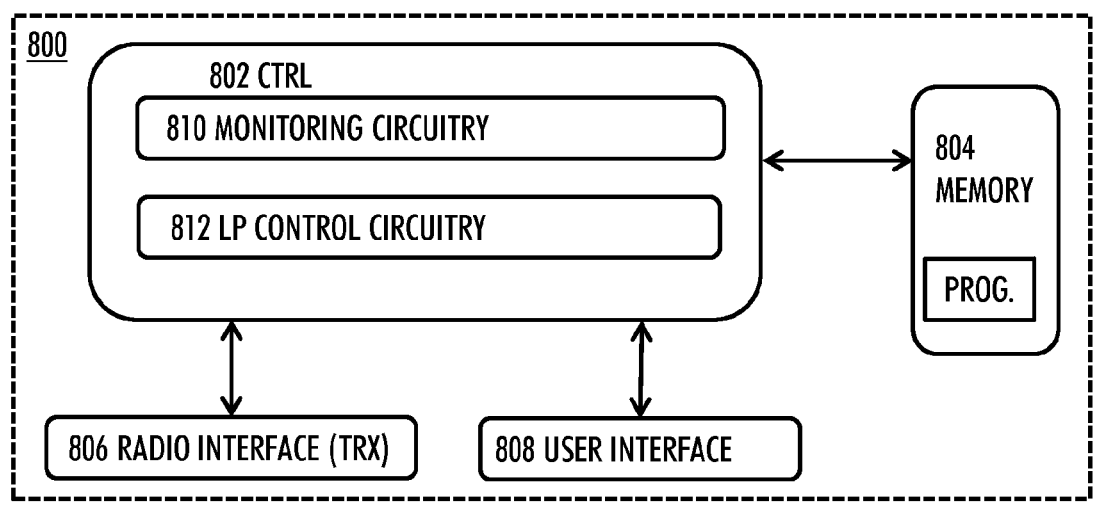
FIG. 8 illustrates an apparatus according to an embodiment.

An embodiment, as shown in FIG. 8, provides an apparatus 800 comprising a control circuitry (CTRL) 802, such as at least one processor, and at least one memory 804 including a computer program code (PROG), wherein the at least one memory and the computer program code (PROG), are configured, with the at least one processor, to cause the apparatus 800 to carry out any one of the above-described processes. The memory 804 may be implemented using any suitable data storage technology, such as semiconductor based memory devices, flash memory, magnetic memory devices and systems, optical memory devices and systems, fixed memory and removable memory.

In an embodiment, the apparatus 800 may be or be comprised in a network node, such as in the AP 100. The control circuitry 802 may comprise a monitoring circuitry 810 for monitoring the spectrum in order to detect advertisement signals (such as beacons, probe responses, etc.) and for decoding the information elements 500 and the proposal messages 504 transmitted by the overlapping APs, such as APs 400, 402. The circuitry 810 may also be responsible of determining the traffic load situation in the network as well as the ratio between the high performance devices 102-104 and the legacy devices 106-108. A legacy period control circuitry 812 may be for determining which contention period timing parameters are to be applied, for synchronizing the CP timing accordingly and for proposing CP timing to neighbouring networks, for example. The circuitry 812 may also be responsible of setting the conflict indicator 502 to a desired value and forming the information element 500 and/or the proposal message 504. As explained earlier, the proposal message 504 may be used in inter-AP negotiating about the CP timing among the APs 100, 400, 402, e.g. in the case the AP 100 detects distinct legacy period operations in the neighbouring APs 400, 402. Advantageously, after the negotiation phase, the neighbouring APs 400, 402 may operate with a common LP.

The apparatus may further comprise communication interface (TRX) 806 comprising hardware and/or software for realizing communication connectivity according to one or more communication protocols. The TRX may provide the apparatus with communication capabilities to access the radio access network, for example.

The apparatus 800 may also comprise a user interface 808 comprising, for example, at least one keypad, a microphone, a touch display, a display, a speaker, etc. The user interface 808 may be used to control the apparatus 800 by the user.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   detecting, by a node of a first wireless network, that at least one overlapping second wireless network is configured to apply contention periods and contention-free periods for communicating with different subsets of devices;
   detecting that a contention period timing applied by the at least one overlapping second wireless network is not aligned with a contention period timing applied by the node of the first wireless network; and
   causing a modification of the contention period timing in at least one of the wireless networks in order to have the contention periods to take place at least partly at the same time in each overlapping wireless network.

2. The method of claim 1, further comprising:
   causing a reception of a timing-related information element from at least one overlapping second wireless network, wherein the information element indicates the contention period timing in the corresponding overlapping second wireless network.

3. The method of claim 2, wherein the information element is comprised in an advertisement message.

4. The method of claim 2, further comprising:
   detecting that the indicated contention period timing is acceptable for use in the first wireless network;
   modifying the contention period timing of the first wireless network on the basis of the indicated contention period timing; and
   including an indication of the changed contention period timing in a next advertisement message.

5. The method of claim 1, further comprising:
   upon deciding to change the contention period timing of the first wireless network, causing a transmission of a proposal message to the at least one second wireless network, wherein the proposal message includes a proposal of the new contention period timing.

6. The method of claim 1, wherein there is a plurality of overlapping second wireless networks, the method further comprising:
   detecting that the contention period timings in the plurality of second wireless networks are aligned with each other; and
   modifying the contention period timing of the first wireless network on the basis of the contention period timing in the plurality of second wireless network.

7. The method of claim 1, wherein there is a plurality of overlapping second wireless networks, the method further comprising:
   detecting that the contention period timing in at least one of the second wireless networks is not aligned with the contention period timing in the rest of the second wireless networks; and
   selecting one of the detected contention period timings;
   causing a transmission of a proposal message to the plurality of second wireless network, wherein the proposal message includes a proposal of the selected contention period timing and an indication that the selected contention period timing is proposed in order to solve a contention period timing conflict among the plurality of second wireless networks.

8. The method of claim 7, further comprising:
   causing a reception of an indication indicating that the selected contention period timing cannot be applied in at least one of the plurality of second wireless networks; and
   selecting another detected contention period timing and proposing that to the plurality of second wireless networks.

9. The method of claim 7, further comprising:
   causing the transmission of the proposal message during a contention period of that second wireless network whose contention period timing is to be changed.

10. An apparatus, comprising:
    at least one processor and at least one memory including a computer program code, wherein the at least one memory and the computer program code are configured, with the at least one processor, to cause a node of a first wireless network at least to:
    detect that at least one overlapping second wireless network is configured to apply contention periods and contention-free periods for communicating with different subsets of devices;
    detect that a contention period timing applied by the at least one overlapping second wireless network is not aligned with a contention period timing applied by the node of the first wireless network; and
    cause a modification of the contention period timing in at least one of the wireless networks in order to have the contention periods to take place at least partly at the same time in each overlapping wireless network.

11. The apparatus of claim 10, wherein the at least one memory and the computer program code are configured, with the at least one processor, to cause the node of the first wireless network further to:
    cause a reception of a timing-related information element from at least one overlapping second wireless network, wherein the information element indicates the contention period timing in the corresponding overlapping second wireless network.

12. The apparatus of claim 11, wherein the information element is comprised in an advertisement message.

13. The apparatus of claim 11, wherein the at least one memory and the computer program code are configured, with the at least one processor, to cause the node of the first wireless network further to:
    detect that the indicated contention period timing is acceptable for use in the first wireless network;
    modify the contention period timing of the first wireless network on the basis of the indicated contention period timing; and
    include an indication of the changed contention period timing in a next advertisement message.

14. The apparatus of claim 10, wherein the at least one memory and the computer program code are configured, with the at least one processor, to cause the node of the first wireless network further to:
    upon deciding to change the contention period timing of the first wireless network, cause a transmission of a proposal message to the at least one second wireless network, wherein the proposal message includes a proposal of the new contention period timing.

15. The apparatus of claim 10, wherein there is a plurality of overlapping second wireless networks, wherein the at least one memory and the computer program code are configured, with the at least one processor, to cause the node of the first wireless network further to:
    detect that the contention period timings in the plurality of second wireless networks are aligned with each other; and
    modify the contention period timing of the first wireless network on the basis of the contention period timing in the plurality of second wireless network.

16. The apparatus of claim 10, wherein there is a plurality of overlapping second wireless networks, wherein the at least one memory and the computer program code are configured, with the at least one processor, to cause the node of the first wireless network further to:
- detect that the contention period timing in at least one of the second wireless networks is not aligned with the contention period timing in the rest of the second wireless networks; and
- select one of the detected contention period timings;
- cause a transmission of a proposal message to the plurality of second wireless network, wherein the proposal message includes a proposal of the selected contention period timing and an indication that the selected contention period timing is proposed in order to solve a contention period timing conflict among the plurality of second wireless networks.

17. The apparatus of claim 16, wherein the at least one memory and the computer program code are configured, with the at least one processor, to cause the node of the first wireless network further to:
- cause a reception of an indication indicating that the selected contention period timing cannot be applied in at least one of the plurality of second wireless networks; and
- select another detected contention period timing and proposing that to the plurality of second wireless networks.

18. The apparatus of claim 16, wherein the at least one memory and the computer program code are configured, with the at least one processor, to cause the node of the first wireless network further to:
- cause the transmission of the proposal message during a contention period of that second wireless network whose contention period timing is to be changed.

19. The apparatus of claim 10, wherein the node of the first wireless network is at least one of an access node and an access point, and the wireless networks are wireless local area networks of the IEEE 802.11.

20. A non-transitory computer readable medium embodying at least one computer program code, the at least one computer program code executable by at least one processor to perform operations comprising:
- detecting, by a node of a first wireless network, that at least one overlapping second wireless network is configured to apply contention periods and contention-free periods for communicating with different subsets of devices;
- detecting that a contention period timing applied by the at least one overlapping second wireless network is not aligned with a contention period timing applied by the node of the first wireless network; and
- causing a modification of the contention period timing in at least one of the wireless networks in order to have the contention periods to take place at least partly at the same time in each overlapping wireless network.

* * * * *